(12) United States Patent
Kinoshita et al.

(10) Patent No.: US 12,191,663 B2
(45) Date of Patent: Jan. 7, 2025

(54) POWER SUPPLY AND DEMAND PLANNING DEVICE

(71) Applicant: HITACHI, LTD., Tokyo (JP)

(72) Inventors: Yoshihito Kinoshita, Tokyo (JP); Kota Imai, Tokyo (JP); Tatsuya Maeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 407 days.

(21) Appl. No.: 17/641,833

(22) PCT Filed: Sep. 2, 2020

(86) PCT No.: PCT/JP2020/033187
§ 371 (c)(1),
(2) Date: Mar. 10, 2022

(87) PCT Pub. No.: WO2021/100285
PCT Pub. Date: May 27, 2021

(65) Prior Publication Data
US 2022/0376500 A1 Nov. 24, 2022

(30) Foreign Application Priority Data

Nov. 20, 2019 (JP) ................................ 2019-209675

(51) Int. Cl.
*H02J 3/00* (2006.01)
*H02J 3/46* (2006.01)

(52) U.S. Cl.
CPC .............. *H02J 3/004* (2020.01); *H02J 3/003* (2020.01); *H02J 3/466* (2020.01)

(58) Field of Classification Search
CPC ............ H02J 3/004; H02J 3/003; H02J 3/466; G06Q 30/0202; G06Q 10/063; G06Q 50/06
See application file for complete search history.

(56) References Cited

U.S. PATENT DOCUMENTS

2014/0172503 A1* 6/2014 Hammerstrom ....... G05B 15/02
705/7.31
2016/0258361 A1* 9/2016 Tiwari ................... G06Q 10/06
(Continued)

OTHER PUBLICATIONS

Partial Supplementary European Search Report received in corresponding European Application No. 20888959.2 dated Nov. 6, 2023.
(Continued)

*Primary Examiner* — Ziaul Karim
(74) *Attorney, Agent, or Firm* — MATTINGLY & MALUR, PC

(57) ABSTRACT

This power supply and demand planning device includes: an output range calculation unit that calculates the output range of a power generator that satisfies a plurality of restriction conditions; a power generation output range output calculation unit that calculates the power generator output in a single cross section on the basis of the calculated output range calculated; and a past specified cross section output correction unit that calculates a target output in the single cross section when a restriction condition violation occurs in the power generator output in the calculated single cross section calculated, and in order to eliminate a restriction condition violation, corrects the output range and the power generator output in the single cross section and a past cross section further in the past than the single cross section so that the power generator output in the single cross section becomes the target output.

9 Claims, 12 Drawing Sheets

(56) References Cited

U.S. PATENT DOCUMENTS

| | | | |
|---|---|---|---|
| 2016/0281607 A1* | 9/2016 | Asati | F02C 7/26 |
| 2017/0060161 A1* | 3/2017 | Tyler | G05B 19/042 |

OTHER PUBLICATIONS

Rong, A. et al., "An Effective Heuristic for Combined Heat-and-Power Production Planning with Power Ramp Constraints", Applied Energy, Nov. 10, 2006, pp. 307-325, vol. 84, No. 3, Elsevier Science Publishers, GB, XP005758322, ISSN: 0306-2619, DOI: 10.1016/J.APENERGY.2006.07.005.

Yorino, N. et al., "Feasible Operation Region for Dynamic Economic Load Dispatch", Tencon 2010—2010 IEEE Region 10 Conference, IEEE, Piscataway, NJ, USA, Nov. 21, 2010, pp. 563-567, XP031898498, DOI: 10.1109/TENCON.2010.5686744, ISBN: 978-1-4244-6889-8.

Motonobu Yoshikawa, et al., Method for Unit Commitment of Thermal and Pumped-storage Hydro Power Plants, T. IEE Japan, 1994, vol. 114-B, No. 12, p. 1220-1226.

Toshiyuki SAWA, et al., Daily Integrated Generation Scheduling for Thermal, Pumped-Storage Hydro and Cascaded Hydro Units and Purchasing Power Considering Network Constraints, The Institute of Electrical Engineers of Japan, 2008, vol. 128, No. 10, p. 1227-1234.

Yasuhiro Kojima, et al., Development of EDC Considering Cooperation with AFC, Journal of the Institute of Electrical Engineers of Japan, 2005, vol. 125, No. 2, p. 170-176.

International Search Report of PCT/JP2020/033187 dated Nov. 17, 2020.

* cited by examiner

FIG. 5

| TIME SECTION | POWER GENERATOR | OUTPUT MARGIN | | POWER GENERATOR OUTPUT |
|---|---|---|---|---|
| | | OUTPUT UPPER LIMIT – OUTPUT | OUTPUT – OUTPUT LOWER LIMIT | |
| T | G1 | M111 | M112 | P11 |
| | G2 | M121 | M122 | P12 |
| | ⋮ | ⋮ | ⋮ | ⋮ |
| | TOTAL | M11 | M12 | P1 |
| T-1 | G1 | M211 | M212 | P21 |
| | G2 | M221 | M222 | P22 |
| | ⋮ | ⋮ | ⋮ | ⋮ |
| | TOTAL | M21 | M22 | P2 |
| ⋮ | ⋮ | ⋮ | ⋮ | ⋮ |

21a

POWER SUPPLY AND DEMAND PLANNING DEVICE

TECHNICAL FIELD

The present invention relates to a power generation planning apparatus which supports the planning of a power supply plan performed by business operators that own a plurality of power generation facilities or power suppliers such as power brokers.

BACKGROUND ART

A power generation plan of a power generator is a plan of deciding the operation and shutdown status and the output of the power generator to match the power demand, based on the power demand forecast value at each time of the plan period, so as to satisfy the operational constraints of each power generator or power system. This kind of power generation planning method of a power generator is disclosed, for example, in NPTL 1 and NPTL 2. As disclosed in these literature, the power generation plan is calculated so as to minimize the total power generation cost while satisfying the power generation balance so that the power demand and power supply will coincide, and the operational constraints of each power generator or power system such as the minimum-up time and the minimum-down time where the power generator maintains its status for a given period after the generator turns on or off. In this calculation of the power generation plan, even when there is only one power generator, when the two statuses of on and off of the power generator are considered for time periods of the power generation plan, an enormous number ($2^n$ types) of power generation plan combinations is conceivable. Thus, an optimization technique for deciding, in a short time, the power generation plan which minimizes the total power generation cost among the enormous number of power generation plans is indispensable.

Meanwhile, in recent years, renewable energy such as photovoltaic generation in which its output is dependent on the weather is being connected to a large-scale power system. For example, with photovoltaic generation, its power is generated only during the time period with sunlight, but since enormous amount of photovoltaic generations are introduced to power system, it becomes a power generation amount that is nearly equivalent to most of the power demand during the day. As a result of photovoltaic generation amount decreasing sharply from daytime to nighttime, the demand obtained by subtracting the photovoltaic generation amount from the power demand will change sharply.

The power generation equivalent to this sharply changing demand needs to be generated by using, for example, thermal power generators, and it is necessary to decide the start/stop and output of each thermal power generator so that it can keep up with the sharp change. Here, since the thermal power generator has the operational constrains known as the output ramp rate, which is the maximum speed that the output can be adjusted, with a thermal power generator having a small output change speed, the output needs to be adjusted in advance. In light of the above, as disclosed in NPTL 3, it is necessary to decide the output of the power generator while optimizing multiple periods under the operational constraints such as the output ramp rate.

CITATION LIST

NPTL

[NPTL 1] Mototsune Yoshikawa, Toshiyuki Sawa, Hiroshi Nakashima, Mitsuo Kinoshita, Yoshiyuki Kurebayashi, Yuji Nakata, "Method for Unit Commitment of Thermal and Pumped storage Hydro Power Plants", Journal of the Institute of Electrical Engineers of Japan B (Publication of Power and Energy Society), The Institute of Electrical Engineers of Japan, 1994, Vol. 114, No. 12, p. 1220-1226

[NPTL 2] Toshiyuki Sawa, Yasuo Sato, Mitsuo Tsurugai, Tsukasa Onishi, "Daily Integrated Generation Scheduling for Thermal, Pumped-Storage Hydro and Cascaded Hydro Units and Purchasing Power Considering Network Constraints", Journal of the Institute of Electrical Engineers of Japan B (Publication of Power and Energy Society), The Institute of Electrical Engineers of Japan, 2008, Vol. 128, No. 10, p. 1227-1234

[NPTL 3] Yasuhiro Kojima, Shizuka Nakamura, Masaya Abe, Osamu Takahashi, Eiichi Tsukada, Takahisa Kurokawa, "Development of EDC Considering Cooperation with AFC", Journal of the Institute of Electrical Engineers of Japan B (Publication of Power and Energy Society), The Institute of Electrical Engineers of Japan, 2005, Vol. 125, No. 2, p. 170-176

SUMMARY OF THE INVENTION

Problems to be Solved by the Invention

As described above, in order to obtain a power generation amount that is equivalent, for example, to a sharply changing demand, with a power generator having a small output ramp rate, the output needs to be adjusted in advance. Thus, while it is necessary to decide the output of the power generator by optimizing multiple time periods as described in NPTL 3, since the number of parameters to be optimized simultaneously will increase according to the length of the periods, the computation time to construct the power generation plan will also increase.

Thus, for example, since the computation time to construct the power generation plan will also increase as the number of parameters to be optimized increases, the challenge is how to shorten the computation time of the power generation plan.

The present invention was devised in view of the foregoing points, an object of this invention is to construct the power generation plan in a shorter time.

Means to Solve the Problems

In order to achieve the foregoing object, as one mode, the present invention provides a power generation planning apparatus, including: an output range calculation unit which calculates an output range of a power generator in each time section that satisfies a plurality of operational constraints; an output calculation unit which calculates a power generator output in each time section based on the output range calculated by the output range calculation unit; and a previous time section output correction unit which calculates a target power outputs for generators violating operational constraints when violation of operational constraint occurs in the power generator output calculated by the output calculation unit, and, in order to eliminate the operational constraint violation, corrects the output range and the power generator outputs violating operational constraints and a previous time section than the time section when operational constraints are violated so that the power generator output in the time section when operational constraints are violated becomes the target output.

Advantageous Effects of the Invention

According to the present invention, for example, it is possible to operate the power generation plan in a shorter time.

BRIEF DESCRIPTION OF DRAWINGS

FIG. 5 is a diagram showing an example of the display screen displayed on the display unit by single time section output saving unit according to the first embodiment.

DESCRIPTION OF EMBODIMENTS

Figure 1:
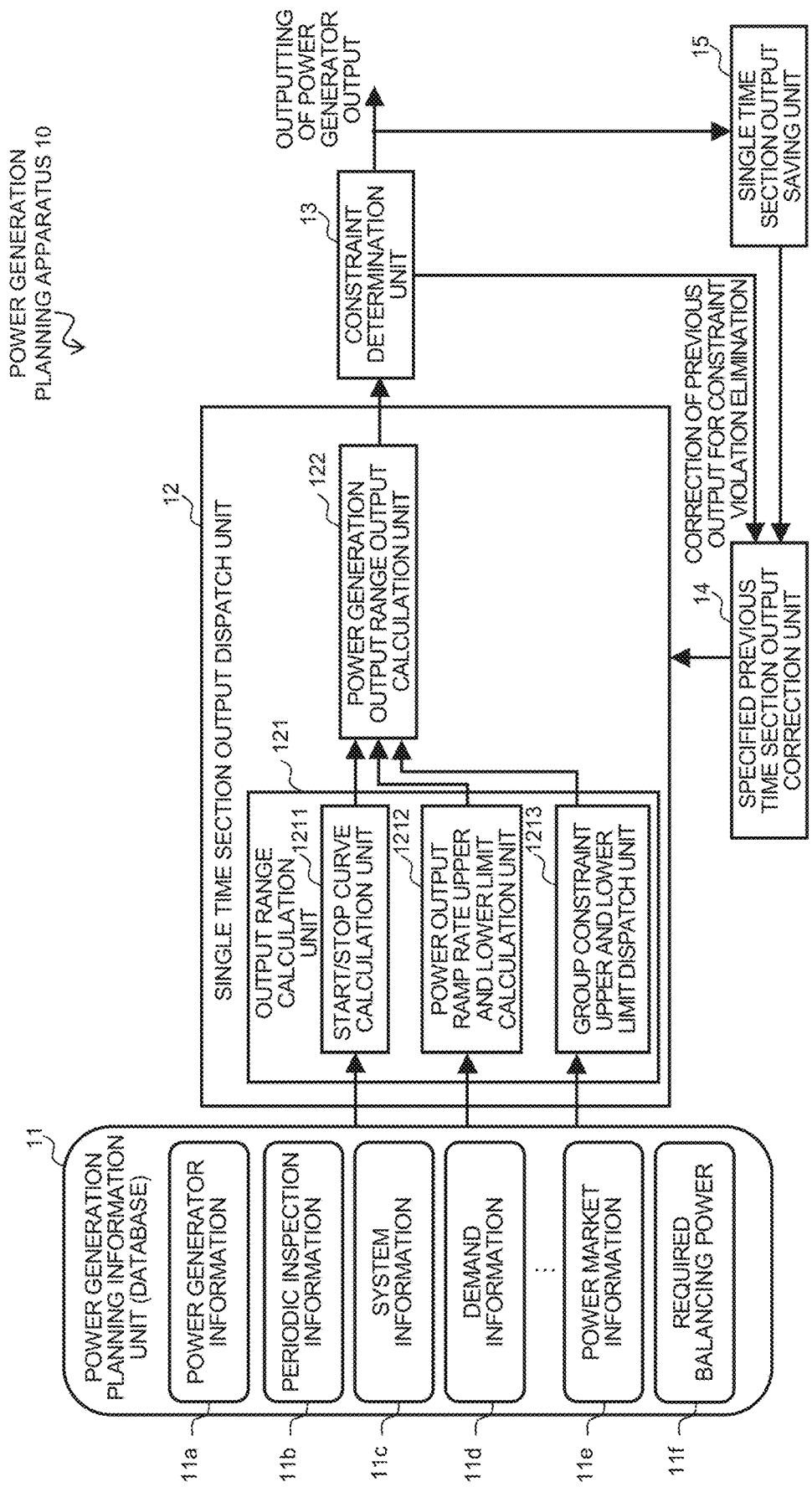
FIG. 1 is a diagram showing a functional configuration example of the power generation planning apparatus according to the first embodiment.

A preferred embodiment of the present invention is now explained. Note that the following embodiment is merely an example of working the present invention, and is not intended to limit the present invention itself to the specific contents of the following embodiment.

Moreover, in the following explanation, the same reference numeral is assigned to the same or similar elements and processing, and redundant explanation will be omitted.

Moreover, in the later embodiments, only the differences in comparison to the previous embodiments will be explained, and redundant explanation will be omitted.

Moreover, the explanation of the following embodiments and the configuration and processing illustrated in the respective drawings show the summary of the embodiments to the extent required for the understanding and working of the present invention, and are not intended to limit the present invention to the embodiments. Moreover, a part of all of the respective embodiments and the respective modified examples may be combined to the extent that they do not deviate from the subject matter of the present invention and are consistent with each other.

First Embodiment

The first embodiment of the present invention is now explained.

<Functional Configuration of Power Generation Planning Apparatus 10>

FIG. 1 is a diagram showing a functional configuration example of the power generation planning apparatus 10 according to the first embodiment. The power generation planning apparatus 10 comprises a power generation planning information unit 11, a single time section output dispatch unit 12, a constraint determination unit 13, a specified previous time section output correction unit 14, and a single time section output saving unit 15. The single time section output dispatch unit 12 comprises an output range calculation unit 121, and a power generation output range output calculation unit 122. The output range calculation unit 121 comprises a start/stop curve calculation unit 1211, a power output ramp rate upper and lower limit calculation unit 1212, and a group constraint upper and lower limit dispatch unit 1213.

The power generation planning information unit 11 stores, as a database, power generator information 11a such as the equipment constant indicating the characteristics of each power generator, periodic inspection information 11b for shut down or limiting the output of each power generator for maintenance inspection, system information 11c such as the maximum transmission capacity of the interconnection line of the power system, demand information 11d corresponding to the required power generation amount, and other information required for the generation plan.

The single time section output dispatch unit 12 calculates each power generator output giving consideration only to a single time section (output at a certain time) based on the input of information stored in the power generation planning information unit 11. The constraint determination unit 13 determines whether an operational constraint is being satisfied in relation to each power generator or power system or generation, saves the result of the power generator output in the single time section output saving unit 15 when there is no constraint violation, and outputs the violating time section to the specified previous time section output correction unit 14 when there is a constraint violation.

The specified previous time section output correction unit 14 eliminates the constraint violation by correcting the power generator output in each time section up to the previous time section by going back from the constraint-violating time section to a certain number of time sections, and saves each of the output-corrected time sections in the single time section output saving unit 15. The single time section output saving unit 15 displays, on a screen, the results of the output correction of each time section that was saved.

The single time section output dispatch unit 12 uses the output range calculation unit 121 to calculate, for each operational constraint, a power generator output range which satisfies each operational constraint based on the input of information stored in the power generation planning information unit 11, and outputs, as an output range, the overlapping range of the respective power generator output ranges calculated for each operational constraint. The power generation output range output calculation unit 122 calculates the power output of each power generator within the foregoing output range.

The output range calculation unit 121 comprises a start/stop curve calculation unit 1211, a power output ramp rate upper and lower limit calculation unit 1212, and a group constraint upper and lower limit dispatch unit 1213. The start/stop curve calculation unit 1211 sets the output upper and lower limit so as to achieve a specified output curve when the start or stop of the power generator is commenced. The power output ramp rate upper and lower limit calculation unit 1212 calculates the output upper and lower limit in which the power output in the current time section will fall within the specification range based on the power output in the previous time section. The group constraint upper and lower limit dispatch unit 1213 calculates the output upper and lower limit of each power generator so that the total output of a plurality of power generators will fall within a specified range. The output range calculation unit 121 selects an output range which overlaps for each power generator from each output range that satisfies the respective operational constraints calculated respectively by the start/stop curve calculation unit 1211, the power output ramp rate upper and lower limit calculation unit 1212, and the group constraint upper and lower limit dispatch unit 1213.

<Hardware Configuration of Power Generation Planning Apparatus 10>

Figure 2:
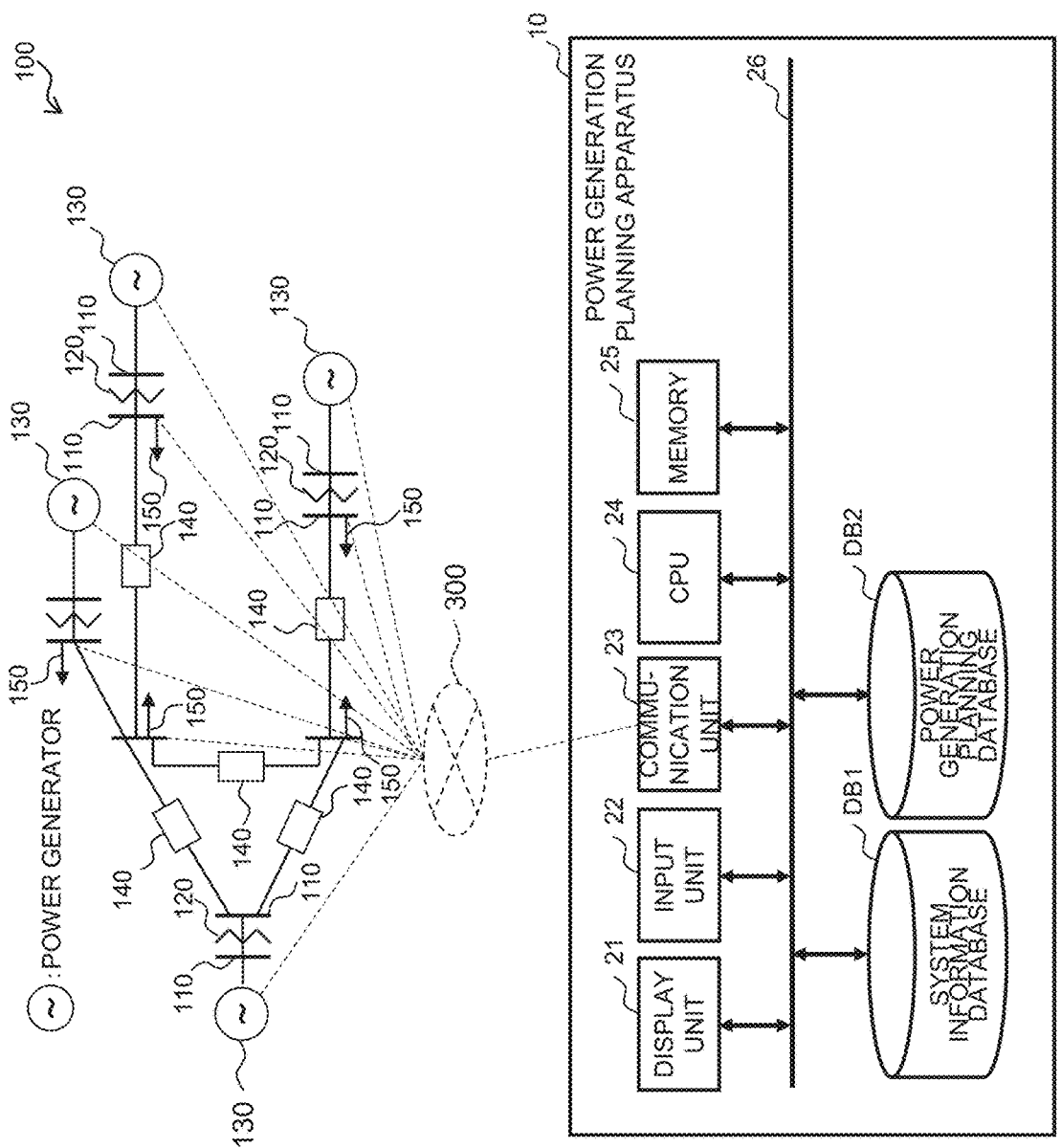
FIG. 2 is a diagram showing a hardware configuration example of the power generation planning apparatus according to the first embodiment.

FIG. 2 is a diagram showing a hardware configuration example of the power generation planning apparatus 10 according to the first embodiment. FIG. 2 shows a hardware configuration example of a power system 100 in which information such as the power generator information 11a and a plurality of measurement data such as a load 150 are stored in a database via the communication network 300, and the power generation planning apparatus 10 of this embodiment. The power system 100 is a system in which a plurality of power generators 130 and the load 150 are mutually linked via a bus (node) 110, a transformer 120, a transmission line 140 and the like. Note that, in FIG. 2, various types of measuring equipment are installed as needed on the bus 110 for the purpose of protecting, controlling and monitoring the power system 100, and the signals detected with the measuring equipment are sent to the communication unit 23 of the power generation planning apparatus 10 via the communication network 300. Note that the communication unit 23 of FIG. 2 additionally communicates with a meteorological system, a power market system, and an aggregator which monitors and controls a plurality of distributed power supplies such as a VPP (Virtual Power Plant) and consumers.

The power generation planning apparatus 10 is configured from a computer system, and a display unit 21 such as a display apparatus, an input unit 22 such as a keyboard or a mouse, a communication unit 23, a CPU 24, a memory 25, and various types of databases (system information database DB1, power generation plan database DB2) are connected via a bus line 26.

Among the above, the display unit 21 may also be configured, for example, to additionally use a printer device or a sound output device in substitute for, or together with, a display device. The input unit 22 may be configured by comprising, for example, at least one among a keyboard switch, a pointing device such as a mouse, a touch panel, and a voice command device. The communication unit 23 comprises a circuit and a communication protocol for connecting to the communication network 300.

The CPU 24 realizes the various units of the power generation planning apparatus 10 by executing programs in coordination with the memory 25, gives instructions on the image data to be displayed, and searches for data in various types of databases. The CPU 24 may be configured as one or more semiconductor chips, or may be configured as a computer device such as a computer server. The memory 25 is configured, for example, as a RAM (Random Access Memory), and stores computer programs, and stores calculation result data and image data required for each processing. The data stored in the memory 25 is sent to and displayed by the display unit 21.

<Power Generator Output Calculation Processing of Power Generation Planning Apparatus 10>

Figure 3:
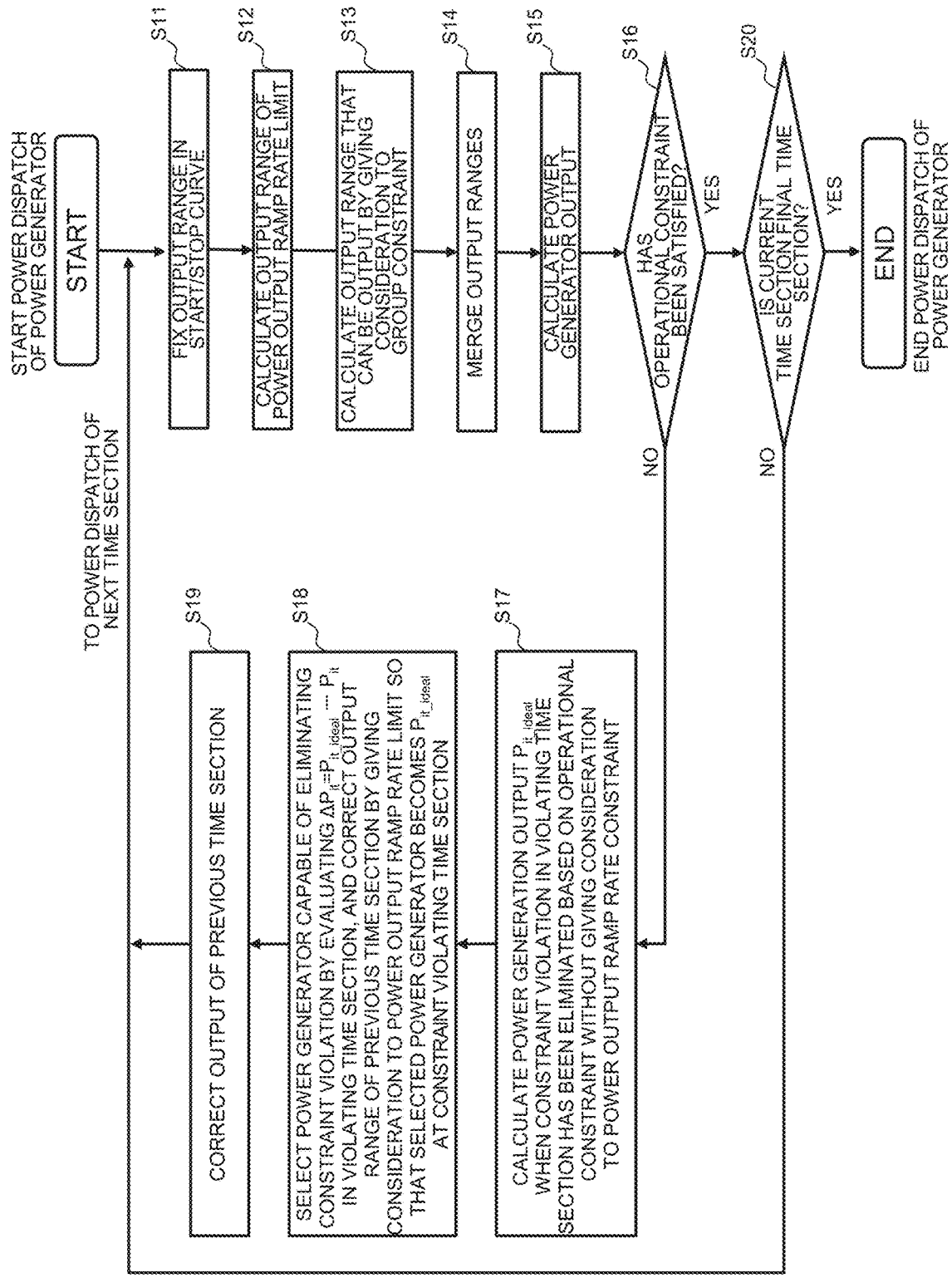
FIG. 3 is a flowchart showing a power generator output dispatch processing example of the power generation planning apparatus according to the first embodiment.

FIG. 3 is a flowchart showing a power generator output dispatch processing example of the power generation planning apparatus 10 according to the first embodiment. In S11 to S15 shown in FIG. 3, the power generation planning apparatus 10 acquires, from the power generation planning information unit 11, information required for the output calculation of the power generator such as the demand of each power generator and the equipment information of the power generator, and uses the output range calculation unit 121 and the power generation output range output calculation unit 122 to calculate the power generator output in a single time section. Prior to the output dispatch processing of the single time section shown in S11 to S15, the output range calculation unit 121 selects one single time section to be processed.

In calculating the power output of each generator, it is necessary to satisfy the operational constraints of the power system 100 and the power generator. As the operational constraint, there are, for example, a start/stop curve constraint that the power output is changed from 0 to a specified output or from a specified output to 0 for transitions of operation on/off status, the power output ramp rate constraint which is the maximum speed that the output can be adjusted in each time section, and a group constraint which is limitation of the total power output of the designated generators to meet transmission capacity for power system.

The start/stop curve calculation unit 1211, the power output ramp rate upper and lower limit calculation unit 1212, and the group constraint upper and lower limit dispatch unit 1213 in the output range calculation unit 121 calculate, for each of these operational constraints, the output upper and lower limit of each power generator which satisfies the respective operational constraints. The method of calculating the output upper and lower limit in the various units is now explained.

In S11, the start/stop curve calculation unit 1211 fixes the output range in the start/stop curve. Specifically, the start/stop curve calculation unit 1211 causes the output upper and lower limit of the power generator that was fixed at the commencement of the start/stop to be the same as the time series data of the output according to the status at the commencement of the start/stop given in advance. This is because the power generator output at the commencement of the start/stop becomes the power generator output that is the same as the time series data of the output according to the status at the commencement of the start/stop given in advance.

In S12, the power output ramp rate upper and lower limit calculation unit 1212 calculates the output upper and lower limit in which the power output in the current time section will fall within a specification range based on the power output in the previous time section. In S14, the group constraint upper and lower limit dispatch unit 1213 calculates the upper and lower limit output which satisfies the group constraint on the condition that the total fuel cost of the power generators will be minimized. The upper and lower limit to meet the group constraint are calculated by solving the optimization problem expressed in following Formula (1-1) to (1-5). When there are multiple group constraints, an operational constraint is added for each group constraint.

[Math 1]

Ojective function:

$$\min\left\{\sum_{i=1}^{N_{gen}}\left(a_i P_{it\_min}^2 + b_i P_{it\_min} + c_i\right) + \sum_{i=1}^{N_{gen}}\left(a_i P_{it\_max}^2 + b_i P_{it\_max} + c_i\right)\right\} \quad (1\text{-}1)$$

Operational Constraints:

Total value of upper limit ($P_{it\_max}$) of specified power generator upper limit of total output of specified power generator (1-2)

Total value of lower limit ($P_{it\_min}$) of specified power generator lower limit of total output of specified power generator (1-3)

Total value of upper limit ($P_{it\_max}$) of specified power generator is maximized (1-4)

Total value of lower limit ($P_{it\_min}$) of specified power generator is minimized (1-5)

i: power generator number, $N_{gen}$: number of power generators, t: time section,
$P_{it\_max}$: upper limit of output range of power generator i in time section t,
$P_{it\_min}$: lower limit of output range of power generator i in time section t,
$a_i$, $b_i$, $c_i$: power generation cost coefficient of power generator i In the optimization problem shown above, the quadratic function based on the coefficients $a_i$, $b_i$, $c_i$ indicating the power generation cost is used as the objective function, and the upper and lower limit value that minimizes the power generation cost is obtained by maximizing the total value of the upper limit $P_{it\_max}$ and minimizing the total value of the lower limit $P_{it\_min}$ within a range that satisfies the group constraint. Note that, in order to obtain a solution to this optimization problem, for instance, an optimization technique such as quadratic programming may be adopted.

Note that the output of the group constraint upper and lower limit dispatch unit 1213 may also be operated in advance from the value of each group constraint targeting the candidates of the start/stop status of the power generator. When calculating the output upper and lower limit or the output dispatch of start/stop in S13, the result of the computation performed in advance to the candidates of a similar start/stop status may be cited.

In S14, the output range calculation unit 121 integrates the output upper and lower limits that satisfy the respective operational constraints in order according to a predetermined priority of the operational constraints in the output upper and lower limit calculated above for each of the operational constraints. When there is no solution as an output range that satisfies the operational constraints in the course of integrating the output upper and lower limits of the output ranges, the output range calculation unit 121 calculates the output range excluding the operational constraint with no solution. Here, the priority may be decided and changed according to the constraint deviation amount or the number of deviations for each constraint classification in a previous time section.

Note that, in substitute for calculating the output upper and lower limit with the respective units of the start/stop curve calculation unit 1211, the power output ramp rate upper and lower limit calculation unit 1212, and the group constraint upper and lower limit dispatch unit 1213 described above, it is also possible to add another operational constraint such as the power output ramp rate constraint to the operational constraints of the optimization problem in the group constraint upper and lower limit dispatch unit 1213 and use, as the output range, the upper and lower limit that satisfies all operational constraints.

In S15, the power generation output range output calculation unit 122 calculates the power output of each power generator which minimizes the power generation cost based on the operational constraint of obtaining a total power output that is equivalent to the demand in the output range of each power generator calculated as described above. Note that, as this calculation method, the equal incremental cost method or the like may be used.

In S16, the constraint determination unit 13 determines whether there is a constraint violation in the processing result of S15. Here, when the operational constraint cannot be satisfied, the constraint determination unit 13 proceeds to the processing of S17 to S19, which is the elimination processing of the constraint violation performed by the specified previous time section output correction unit 14. Meanwhile, when there is no constraint violation, the constraint determination unit 13 advances the processing to S11, and proceeds to the processing of the next time section.

Figure 4:
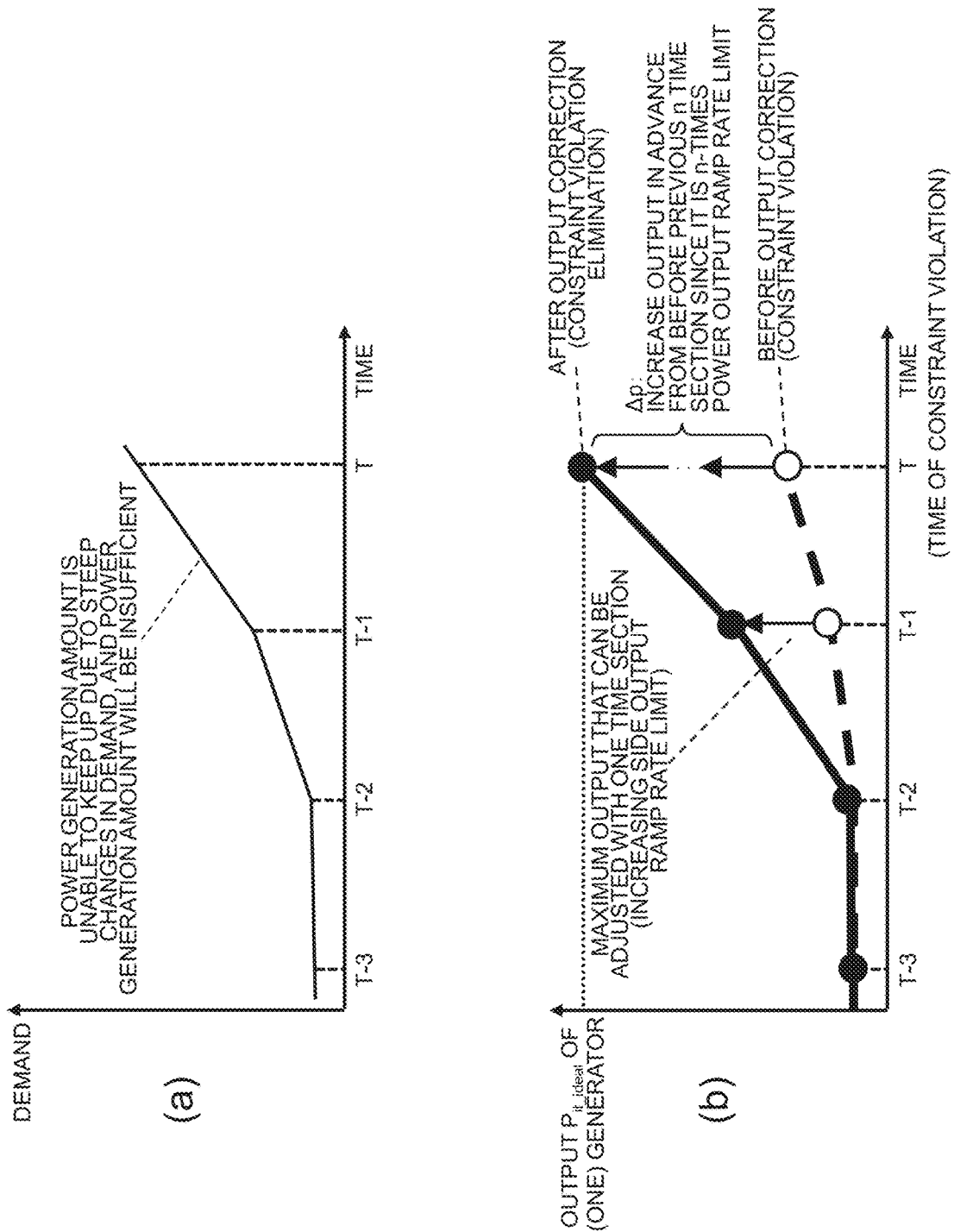
FIG. 4 is a diagram explaining an output correction example for eliminating a constraint violation in the specified previous time section output correction unit according to the first embodiment.

The processing (S17 to S19) to be performed when it is determined that there is a constraint violation in S16 is now explained with reference to FIG. 4. FIG. 4 is a diagram explaining an output correction example for eliminating a constraint violation in the specified previous time section output correction unit 14 according to the first embodiment. Moreover, in the following explanation, explained is a case where the total output of the power generator is unable to keep up with the demand due to the constraint of the power output ramp rate of the power generator when there is a sharp change in the demand, and a constraint violation of the generation balance has occurred.

In S17, the specified previous time section output correction unit 14 calculates the index required for correcting the output in order to eliminate the constraint violation by correcting the output of each power generator of a plurality of previous time sections from the current time section in S17 to S19. When the demand changes sharply as shown in FIG. 4(a), a power generator having a small power output ramp rate is unable to adapt to the change in demand and a constraint violation of the generation balance may occur (power generator output indicated with white circles in FIG. 4(b)). In order to eliminate this constraint violation, it is necessary to increase in advance the output of the power generator having a small power output ramp rate to the output capable of eliminating the constraint violation (indicated with black circles in FIG. 4(b)).

Thus, in S17, the specified previous time section output correction unit 14 executes the same processing as S11 to S15 based on the operational constraint that does not give consideration to the power output ramp rate and calculates, as the index $P_{it\_ideal}$, the target output of each power generator capable of eliminating the constraint violation in the violating time section T.

In S18, the specified previous time section output correction unit 14 evaluates the deviation $\Delta P = P_{it\_ideal} - P_{it}$ of the output capable of eliminating the constraint violation and the output at the time of constraint violation. Subsequently, the specified previous time section output correction unit 14 selects the power generator capable of eliminating the constraint violation from the constraint violation classification (supply and demand inconsistency, group constraint violation, frequency balancing power inadequacy described later, and so on) and the amount of polarity of the deviation $\Delta P$. Subsequently, in order to eliminate the constraint violation, the specified previous time section output correction unit 14 corrects the output range targeting a power generator having a large deviation $\Delta P$ and capable of eliminating the constraint violation.

Here, when the demand change sharply and the power generation amount is insufficient, since the power generation amount shortage can be decreased by increasing the output of power generators in which $\Delta P > 0$ (output is low relative to the demand), the output of the power generator is corrected in a plurality of previous time sections targeting power generators in which $\Delta P > 0$. As the correction amount for each of the plurality of previous time sections, the output lower limit in each time section should be equal to the output upper limit giving consideration to the power output ramp rate across the number of previous time sections corresponding to ($\Delta P$/power output ramp rate) so that it becomes an output that is the same as the index $P_{it\_ideal}$ in the time section where the constraint violation occurred. Thus, the output range is corrected so that the lower limit of the output range of the power generator in which $\Delta P > 0$ becomes equal to the upper limit across the number of previous time sections corresponding to ($\Delta P$/power output ramp rate).

In S19, the specified previous time section output correction unit 14 performs the same power dispatch processing as S11 to S15 based on the output range changed in S18 across the number of time previous sections equivalent to the maximum value of ($\Delta P$/power output ramp rate) among the power generators determined to be $\Delta P > 0$ in S18. Consequently, the power generator in which the output range has been corrected across the previous time sections in S18 becomes a value in which the output thereof has also been corrected, and the output of other power generators is corrected pursuant to the correction of the output of a certain power generator.

Note that, while the processing of S17 to S19 described above explained a case where the power generation amount fell short due to the sharp increase in the demand, the present invention is not limited to this embodiment. For example, if the demand suddenly decreases, the output range should be corrected so that the upper limit becomes the lower limit targeting power generators in which $\Delta P < 0$. Moreover, even in cases where the group constraint changes sharply, the constraint can be eliminated by correcting the output upper limit or the output lower limit according to the polarity of $\Delta P$ capable of reducing the constraint violation in the same group.

When the processing of S19 is completed, the power generation planning apparatus 10 proceeds to the processing of the next time section and, after repeating the processing up to the final time section (S20: Yes), the power dispatch processing of the power generator is thereby completed.

Note that, while the output range and the output of the power generator of the previous time section were corrected by giving consideration to the power output ramp rate constraint in S17 to S18 in order to eliminate the constraint violation determined in S16, without limitation to the power output ramp rate constraint, the output range and the output of the power generator of the previous time section may also be corrected by giving consideration to another operational constraint.

Moreover, with the power dispatch according to this embodiment, the output range and the output of each power generate are calculated in each time section. Thus, the single time section output saving unit 15 may calculate (output upper limit–output) or (output–output lower limit) of each power generator, and display the result on a screen of the display unit 21 or save the data thereof, together with the power generator output, as the output margin of each time section. FIG. 5 is a diagram showing an example of the display screen 21a displayed on the display unit 21 by the single time section output saving unit 15 according to the first embodiment.

Effect of First Embodiment

According to the first embodiment, the power generator output in each time (time section) is calculated only based on the output computation of a single time section. When a constraint violation occurs, the power generator output in the case of not giving consideration to the power output ramp rate constraint is calculated as the index, and, if there is a difference (deviation $\Delta P$) upon comparing the output in the violating time section and the index, it is determined that the constraint violation can be eliminated and the constraint violation elimination processing is performed. In the constraint violation elimination processing, a power generator capable of eliminating the constraint violation is selected from the polarity and amount of $\Delta P$ according to the constraint violation classification (supply and demand inconsistency, group constraint violation, and frequency balancing power inadequacy described later). The output of the selected power generator is corrected based on a plurality of previous time sections than the constraint violating time section, and the power generator output capable of eliminating the constraint violation is calculated by re-calculating the output of all power generators. This processing is entirely realized only by applying the output computation of a single time section, and, by reducing the parameters of the optimization computation to be processed simultaneously, the scale of optimization to be calculated based on the processing for each single time section will decrease, and realized is a shorter computation time in comparison to the calculation of optimizing a plurality of time sections based on simultaneous processing.

Note that, in the calculation of each output range in the single time section computation described above, it is also possible to decide the candidate of the start/stop status of the power generator, calculate the output range in advance for each pattern based on the candidate of the start/stop status and the constraint value, and create a table of the computation results. When the start/stop status or the constraint value pattern of the power generator of the calculation time section coincides in the pattern calculated in advance, the output range calculated in advance is cited without calculating the output range. Consequently, the calculation amount will decrease, and even faster computation can be realized.

Moreover, in the processing to calculate the output of the power generator described above, since the output range and the output of each power generator are respectively calculated, the adjustable output amount (output upper limit—output, output—output lower limit) of each power generator and of all power generators can be calculated from the output range and the output of each power generator. By displaying the output reserve on a screen display or saving the data thereof, the operator can know the margin during operation or the power trading volume that can be traded with the power market based on the output reserve.

Second Embodiment

The second embodiment of the present invention is now explained. Note that any explanation that overlaps with the contents explained in the first embodiment will be omitted.

<Functional Configuration of Power Generation Planning Apparatus 10B>

Figure 6:
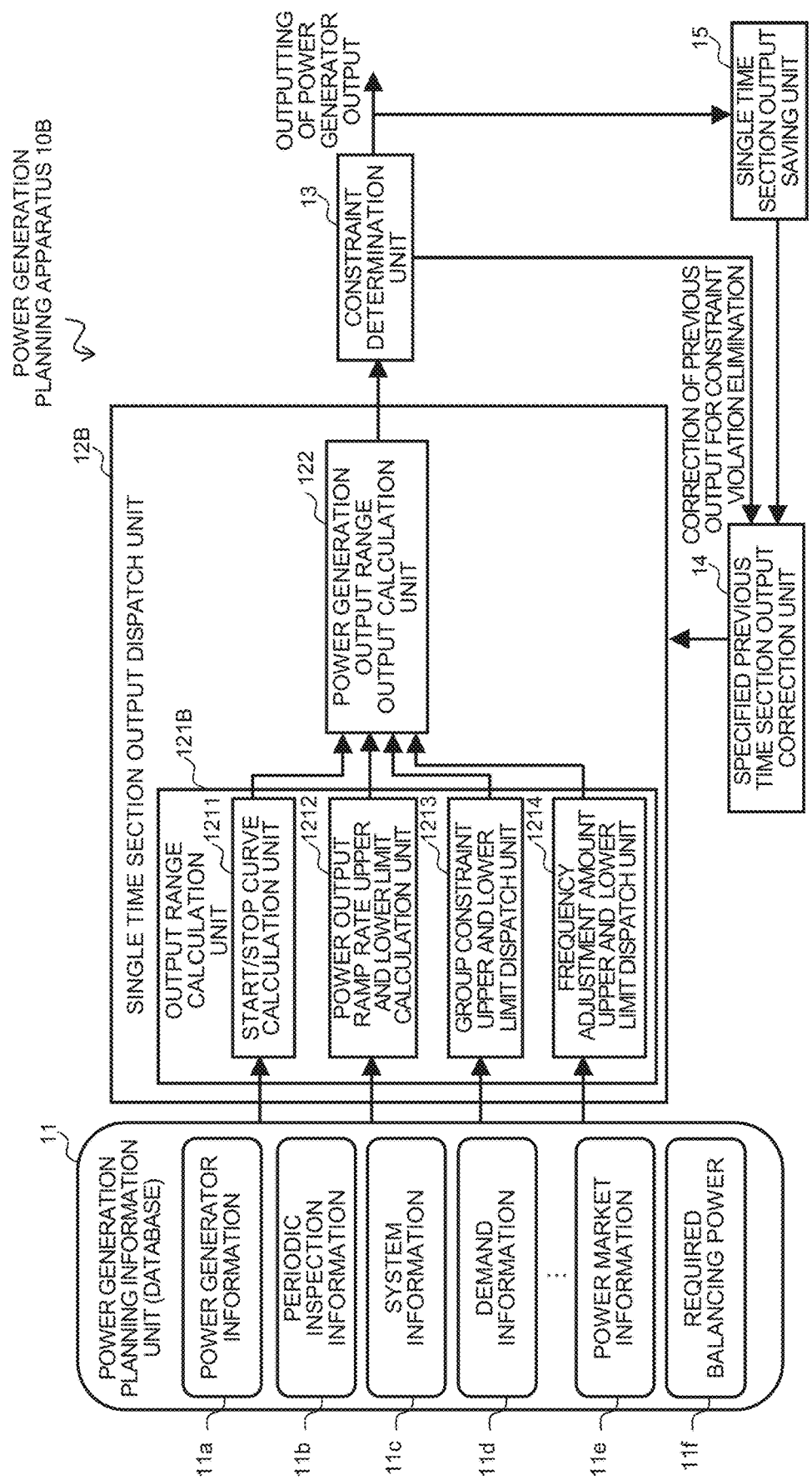
FIG. 6 is a diagram showing a functional configuration example of the power generation planning apparatus according to the second embodiment.

FIG. 6 is a diagram showing a functional configuration example of the power generation planning apparatus 10B according to the second embodiment. The power generation planning apparatus 10B of the second embodiment shown in FIG. 6 differs from the power generation planning apparatus 10 of the first embodiment in that the output range calculation unit 121B in the single time section output dispatch unit 12B is equipped with a frequency adjustment amount upper and lower limit dispatch unit 1214.

The frequency adjustment amount upper and lower limit dispatch unit 1214 outputs the output range of each power generator capable of securing the required balancing power (required frequency adjustment amount) based on the input of information including the power generator information 11a such as the specification indicating the characteristics related to the frequency adjustment amount of each power generator from the power generation planning information unit 11, important information 11d and required balancing power 11f. The output range calculation unit 121 outputs the output range that overlaps with each power generator from the output range that satisfies each operational constraint calculated by the respective units of the output range calculation unit 121B, including the output of the frequency adjustment amount upper and lower limit dispatch unit 1214.

<Power Generator Output Calculation Processing of Power Generation Planning Apparatus 10B>

Figure 7:
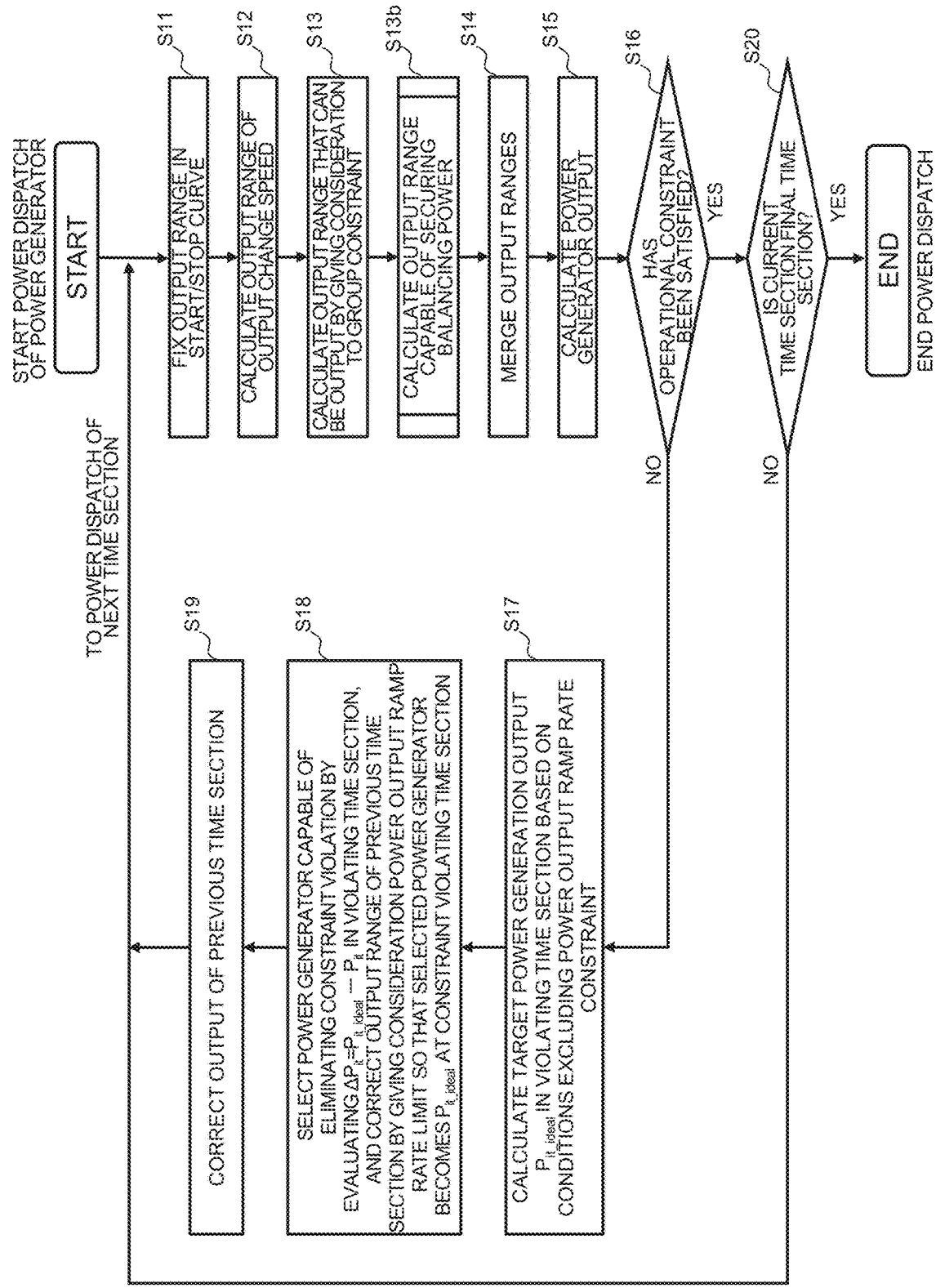
FIG. 7 is a flowchart showing an output dispatch processing example of the power generation planning apparatus according to the second embodiment.

FIG. 7 is a flowchart showing an output dispatch processing example of the power generation planning apparatus 10B according to the second embodiment. In the output dispatch processing of the power generation planning apparatus 10B of the second embodiment, due to the addition of the frequency adjustment amount upper and lower limit dispatch unit 1214, the processing of S13b has been added subsequent to S13 in comparison to the output dispatch processing of the power generation planning apparatus 10 of the first embodiment.

In S11 to S15 shown in FIG. 7, information required for the output calculation of the power generator such as the demand and the equipment information of the power generator from the power generation planning information unit 11 is selected, and the power generator output in a single time section is calculated by the output range calculation unit 121B and the power generation output range output calculation unit 122.

As the operational constraints of calculating the output of each power generator, there is a frequency adjustment amount constraint in addition to the start/stop curve constraint, the power output ramp rate constraint, and the group constraint. Here, the frequency adjustment amount is the adjustment amount of the output of the power generator capable of suppressing the frequency fluctuation in several minutes by adjusting the output of the power generator when the frequency of the power system, which is being operated at a system frequency of 50 Hz or 60 Hz, fluctuates. Here, the output that can be adjusted in several minutes is the frequency adjustment amount, and the act of securing the frequency adjustment amount required for the system operation with all power generators are treated as the frequency adjustment amount constraint.

In response to these operational constraints, the start/stop curve calculation unit 1211, the power output ramp rate upper and lower limit calculation unit 1212, the group constraint upper and lower limit dispatch unit 1213, and the frequency adjustment amount upper and lower limit dispatch unit 1214 in the output range calculation unit 121B calculate the output upper and lower limit of each power generator which satisfies the respective operational constraints. The calculation method the output upper and lower limit performed by the frequency adjustment amount upper and lower limit dispatch unit 1214 in S13b of FIG. 7 is now explained.

Figure 8:
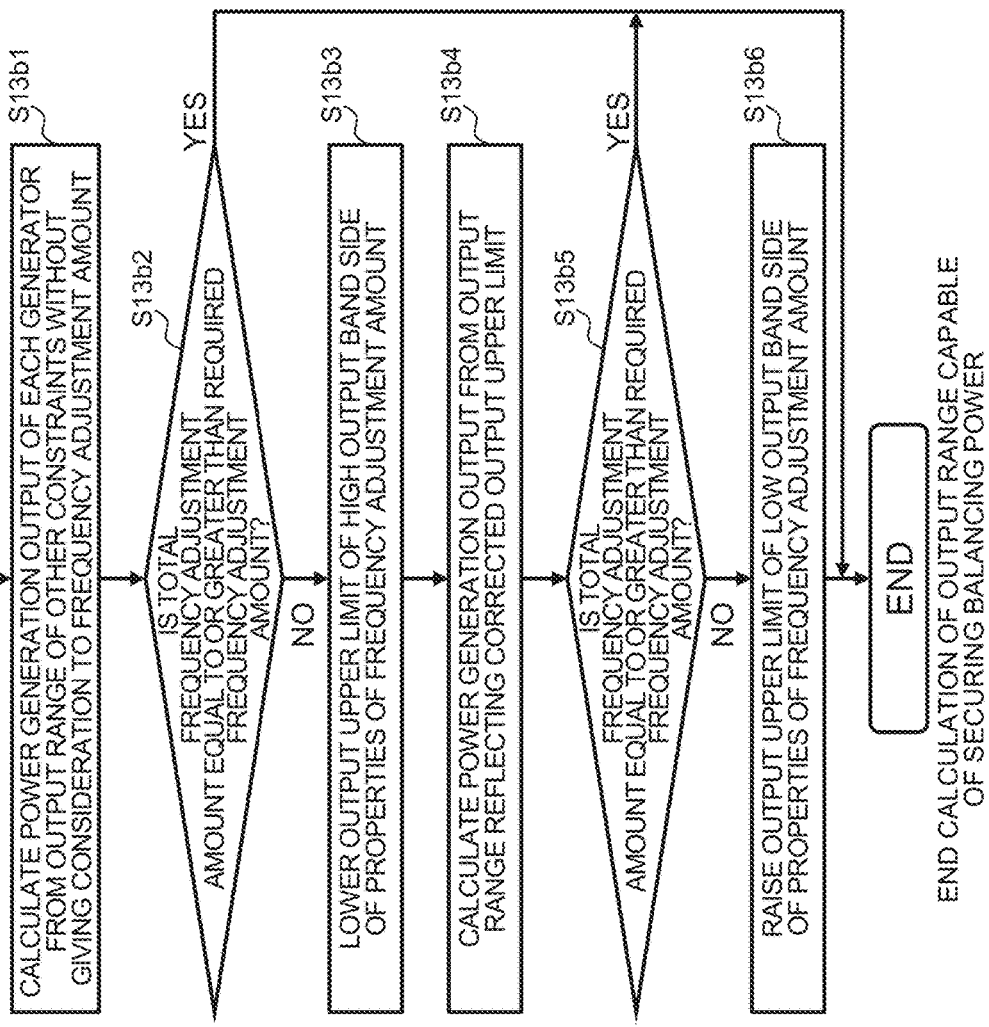
FIG. 8 is a flowchart showing a processing example of the frequency adjustment dispatch upper and lower limit dispatch unit of the power generation planning apparatus according to the second embodiment.
Figure 9:
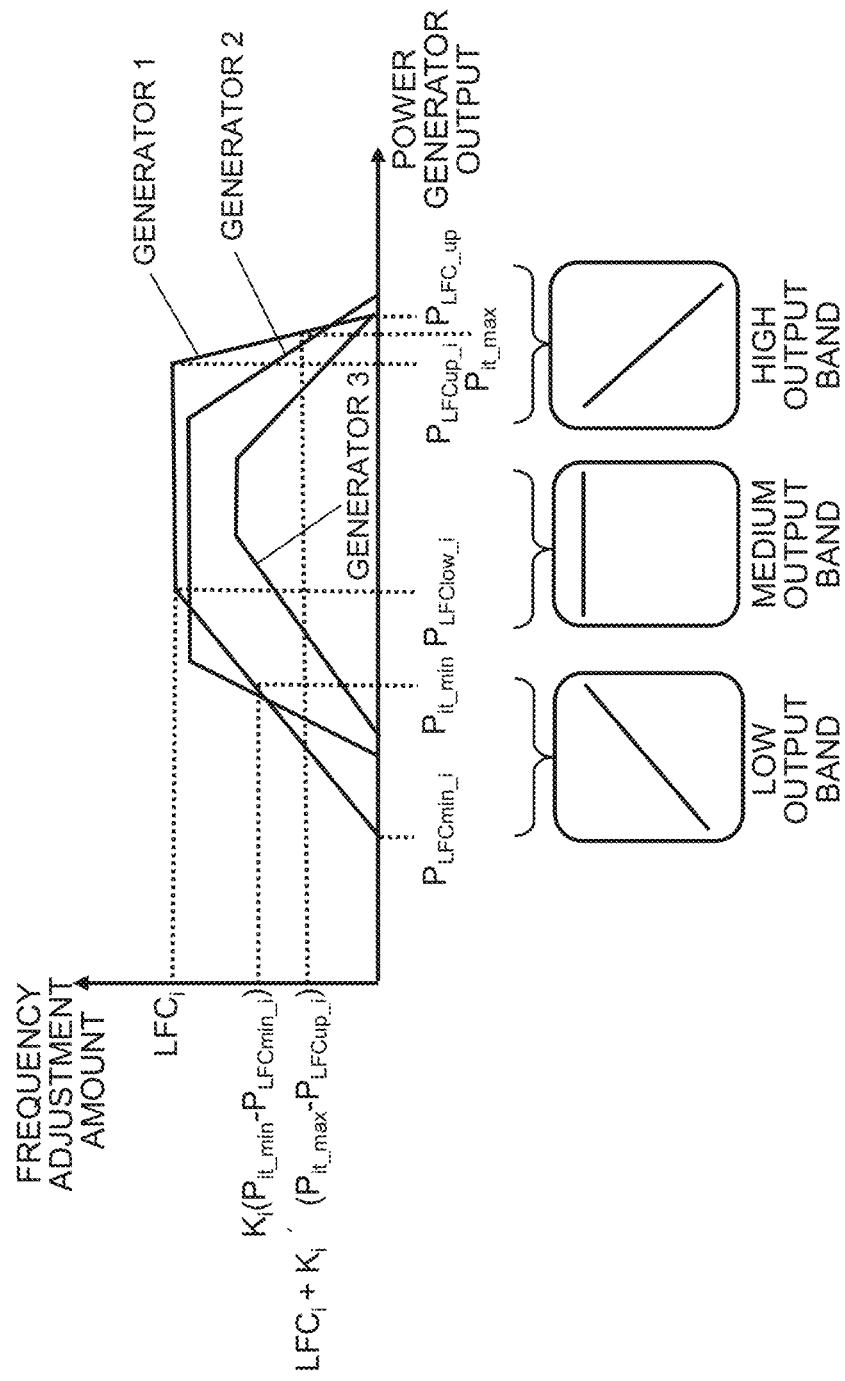
FIG. 9 is a diagram showing an example of the characteristics of the frequency adjustment dispatch of each power generator in the processing performed by the frequency adjustment dispatch upper and lower limit dispatch unit of the power generation planning apparatus according to the second embodiment.

FIG. 8 is a flowchart showing a processing example of the frequency adjustment amount upper and lower limit dispatch unit 1214 of the power generation planning apparatus 10B according to the second embodiment, and shows the details of the internal processing of the frequency adjustment amount upper and lower limit dispatch unit 1214 in S13b. FIG. 9 is a diagram showing an example of the characteristics of the frequency adjustment amount of each power generator in the processing performed by the frequency adjustment amount upper and lower limit dispatch unit 1214 of the power generation planning apparatus 10B according to the second embodiment.

In S13b of FIG. 7 and the processing of frequency adjustment amount upper and lower limit dispatch unit 1214 shown in FIG. 8, the characteristics of the frequency adjustment amount according to the power generator output are classified into three output bands as shown in FIG. 9. The three output bands are a low output band in which the secured frequency adjustment amount increases pursuant to the output increase, a medium output band in which the secured frequency adjustment amount is unchanged irrespective of the output increase, and a high output band in which the secured frequency adjustment amount decreases pursuant to the output increase.

In S13b of FIG. 7 and the processing shown in FIG. 8, when the frequency adjustment amount constraint can be satisfied without having to execute the correction processing of the upper and lower limit value of the power generator output, the frequency adjustment amount upper and lower limit dispatch unit 1214 calculates the power generator output within a range that satisfies the other constraints without giving consideration to the frequency adjustment amount, and calculates the total frequency adjustment amount that has currently been secured.

As shown in FIG. 8, foremost, in S13b1, the frequency adjustment amount upper and lower limit dispatch unit 1214 calculates the power output of each power generator from the output range that satisfies the other constraints without giving consideration to the frequency adjustment amount constraint. S13b1 is equivalent to executing S11 to S15 of the first embodiment without giving consideration to the frequency adjustment amount upper and lower limit dispatch unit 1214. Here, since the power output of each power generator calculated in S13b1 is, for example, the power output calculated to become the most economic based on the equal incremental cost method, in FIG. 9, the output of a power generator of high efficiency and in which the power generation unit price is inexpensive tends to become a high output band, and the output of a power generator of low efficiency and in which the power generation unit price is expensive tends to become a low output band.

In S13b2, the frequency adjustment amount upper and lower limit dispatch unit 1214 determines whether the total frequency adjustment amount based on the power output calculated in S13b1 satisfies the required frequency adjustment amount, performs the processing of S13b3 onward when there is a shortage (S13b2: NO), and skips the processing of S13b3 onward when the required frequency adjustment amount is satisfied (S13b2: YES).

In S13b3, in order to reduce the shortage of the frequency balancing power, the frequency adjustment amount upper and lower limit dispatch unit 1214 increases the frequency adjustment amount by decreasing the upper limit of the output range and lowering the power output in the high output band calculated in S13b1.

Here, as the method of increasing the frequency balancing power, the power output in the low output band may be increased or the power output in the high output band may be reduced. But since the power output in a low output band has low efficiency, expensive power generation unit price, and the economic efficiency will worsen when increased, the high output band is given preference. Thus, the processing of S13b3 targets the high output band.

In S13b3, the frequency adjustment amount upper and lower limit dispatch unit 1214 calculates the upper limit of the output range which secures the frequency balancing power by solving the optimization problem of following Formulas (2-1) to (2-3) so that the frequency balancing power can be secured while suppressing the power generation cost. The optimization problem can be solved based on quadratic programming or the like. The "adjustment amount secured according to output of power generator i in high output band" indicated in the left member of following Formula (2-2) is shown taking the characteristics of the frequency adjustment amount of the "power generator 1" in FIG. 9 as an example.

[Math 2]

Objective function: (2-1)

$$\min\left\{\sum_{i=1}^{N_{gen}} \left(a_i P_{it\_max}^2 + b_i P_{it\_max} + c_i\right)\right\}$$

Operational constraints: (2-2)

$$\sum_{i=1}^{N_{gen}} \left\{LFC_i + K_i'\left(P_{it\_max} - P_{LFCup_i}\right)\right\} \geq R_{LFCup}$$

$$P_{it\_max} \geq P_{LFCup\_i} \quad (2-3)$$

$P_{it\_max}$: upper limit of output range of power generator i in time section t, $P_{LFCup\_i}$: lowest output value of high output band, i: power generator number, t: time section, $LFC_i + K_i'$ $(P_{it\_max} - P_{LFCup\_i})$: adjustment amount secured according to output of power generator i in high output band, $LFC_i$: maximum frequency adjustment amount secured in high output band, $R_{LFCup}$: total frequency adjustment amount secured in high output band, $a_i$, $b_i$, $c_i$: power generation cost coefficient of power generator i In S13b4, the frequency adjustment amount upper and lower limit dispatch unit 1214 reflects the upper limit calculated in S13b3 in the output range, and calculates the power output of each power generator in the same manner as S13b1. Here, since the upper limit of the power generator in the high output band has decreased in comparison to S13b1, the power output in the high output band will decrease, and the secured total frequency balancing power will increase.

In S13b5, the frequency adjustment amount upper and lower limit dispatch unit 1214 determines whether the total frequency adjustment amount based on the power output of each power generator calculated in S13b4 satisfies the required frequency adjustment amount, performs the processing of S13b6 when there is a shortage (S13b5: NO), and skips the processing of S13b6 when the required frequency adjustment amount is satisfied (S13b5: YES).

In S13b6, in order to reduce the shortage of the frequency balancing power, the frequency adjustment amount upper and lower limit dispatch unit 1214 increases the frequency adjustment amount by increasing the lower limit of the output range and increasing the power output in the low output band calculated in S13b4.

In S13b6, the frequency adjustment amount upper and lower limit dispatch unit 1214 calculates the lower limit of the output range which secures the frequency balancing power by solving the optimization problem of following Formulas (3-1) to (3-3) so that the frequency balancing power can be secured while suppressing the power generation cost. The "adjustment amount secured according to output of power generator i in low output band" indicated in the left member of following Formula (3-2) is shown taking the characteristics of the frequency adjustment amount of the "power generator 1" in FIG. 9 as an example.

[Math 3]

Objective function:

$$\min\left\{\sum_{i=1}^{N_{gen}} \left(a_i P_{it\_min}^2 + b_i P_{it\_min} + c_i\right)\right\} \quad (3-1)$$

Operational constraints: (3-2)

$$\sum_{i=1}^{N_{gen}} K_i(P_{it\_min} - P_{LFCmin\_i}) \geq R_{LFClow}$$

$$P_{LFClow\_i} \geq P_{it\_min} \quad (3-3)$$

$P_{it\_min}$: lower limit of output range of power generator in time section t, $P_{LFClow\_i}$: maximum output value of low output band, i: power generator number, t: time section, $K_i$ $(P_{it\_min} - P_{LFCmin\_i})$: adjustment amount secured according to output of power generator i in low output band, $P_{LFClow}$: total frequency adjustment amount secured in low output band, $a_i$, $b_i$, $c_i$: power generation cost coefficient of power generator i The frequency adjustment amount upper and lower limit dispatch unit 1214 outputs, to the processing of S14 onward of FIG. 7, the upper and lower limit value of the output range that was corrected for securing the frequency adjustment amount described above as the output of S13b.

The processing of S14 onward of FIG. 7 is the same as the first embodiment other than S18. In S18, when there is a shortage in the total frequency adjustment amount and a constraint violation occurs, the constraint violation can be eliminated by the frequency adjustment amount increasing as a result of the power generator output in the low output band increasing and the power generator output in the high output band decreasing based on the characteristics of the frequency adjustment amount of FIG. 9. Consequently, generators in which the power output is in a low output band or a high output band and the polarity of $\Delta P = P_{it\_ideal} - P_{it}$ is a polarity capable of reducing the frequency adjustment amount constraint violation in the respective bandwidths is selected for correcting the output range of previous time sections.

Note that, when there is a constraint violation other than the frequency balancing power constraint violation, a condition may be added to the power generator selection described above. For example, when the constraint violation of the supply and demand inconsistency of the first embodiment is a constraint violation of a power generation amount shortage, $\Delta P > 0$ may be added as a condition.

Moreover, the power output in each single time section may be calculated by executing only the power load dispatch decision processing of S11 to S15 of FIG. 7.

Effect of Second Embodiment

According to the second embodiment, when there is a shortage in the total frequency adjustment amount relative to the required frequency adjustment amount, the required frequency adjustment amount is foremost secured by restricting the power output in the high output band so that the power generation cost will become inexpensive, and the required frequency adjustment amount is subsequently secured by increasing the power generator output in a low output band, in which the power generation unit price is expensive, so that the power generation cost will become inexpensive. As a result of performing processing for securing the required frequency adjustment amount separately with the power outputs of a high output band and the power generators of a low output band, an effect is yielded in that the scale of optimization can be decreased and the computation time can be shortened in comparison to giving consideration to all power outputs of generators simultaneously. Moreover, an effect is yielded in that the economic efficiency can be maintained by preferentially securing the frequency balancing power from a high output band capable of securing the frequency balancing power less expensively than a low output band.

For example, in S17 of FIG. 7, when calculating the target power output $P_{it\_ideal}$ in a violating time section based on a condition of excluding the power output ramp rate constraint, the same processing as S11 to S15 of FIG. 7 is performed. Here, as a result of performing the processing of S13b by classifying the power generator output into a high output band, a medium output band, and a low output band as in the second embodiment, there may be cases where the computation time can be reduced.

Third Embodiment

The third embodiment of the present invention is now explained. Note that any explanation that overlaps with the contents explained in the first and second embodiments will be omitted.

<Functional Configuration of Power Generation Planning Apparatus 10C>

Figure 10:
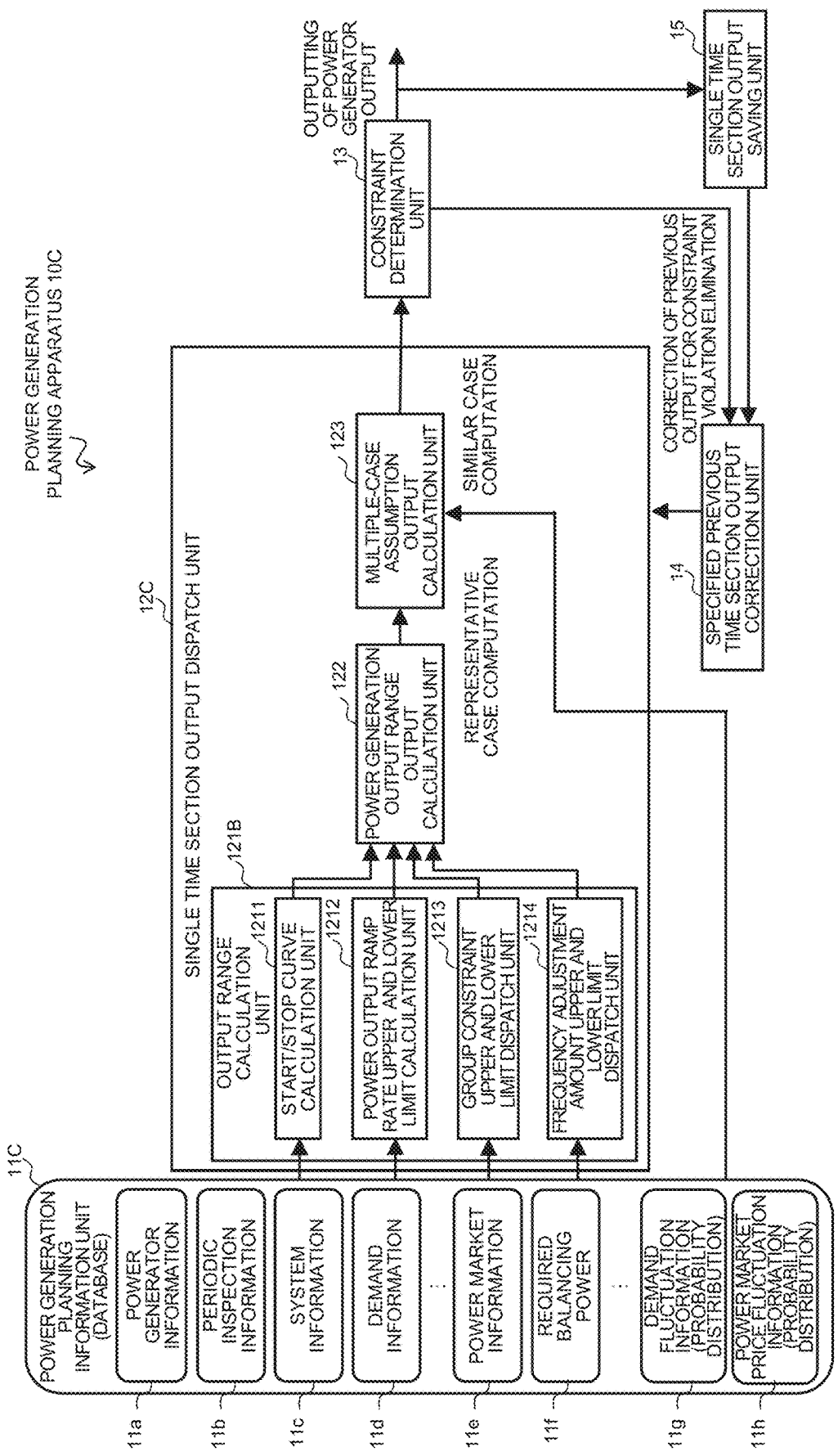
FIG. 10 is a diagram showing a functional configuration example of the power generation planning apparatus according to the third embodiment.

FIG. 10 is a diagram showing a functional configuration example of the power generation planning apparatus 10C according to the third embodiment. The power generation planning apparatus 10C of the third embodiment shown in FIG. 10 differs from the power generation planning apparatus 10B of the second embodiment in that the single time section output dispatch unit 12B is equipped with a multiple-case assumption output calculation unit 123. Moreover, the power generation planning apparatus 10C differs from the power generation planning apparatus 10B of the second embodiment in that the power generation planning information unit 11C additionally stores power demand fluctuation information (probability distribution) 11g and power market price fluctuation information (probability distribution) 11h.

The multiple-case assumption output calculation unit 123 calculates and outputs, based on the representative case, the power generator output and the market trading volume in multiple cases anticipated from the demand fluctuation and the market price fluctuation based on the output and the power generation unit price of the power generator in the representative case of demands and market prices from the power generation output range output calculation unit 122, and the input of the power demand fluctuation information (probability distribution) 11g and the power market price fluctuation information (probability distribution) 11h from the power generation planning information unit 11C.

<Power Generator Output Calculation Processing of Power Generation Planning Apparatus 10C>

Figure 11:
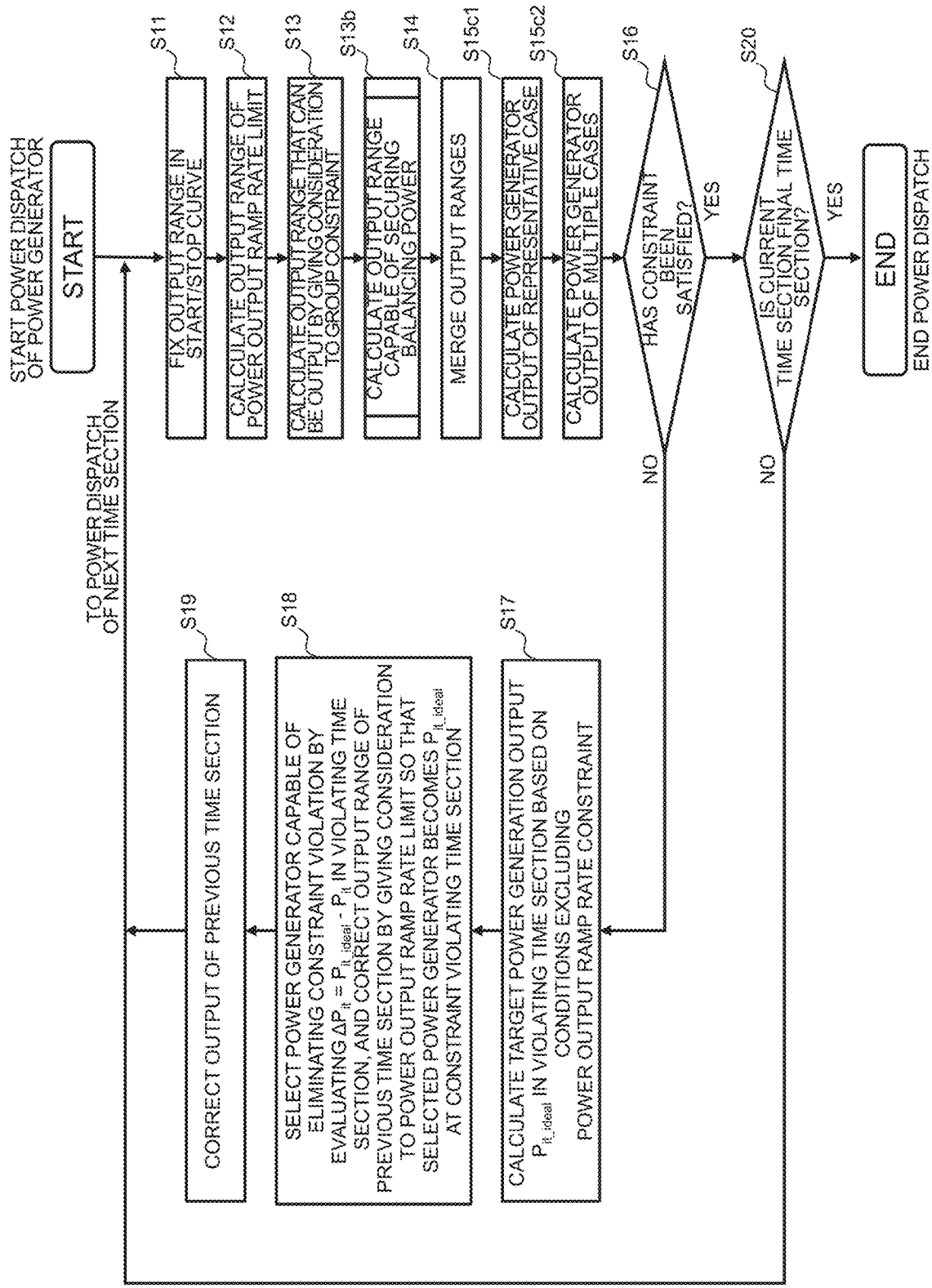
FIG. 11 is a flowchart showing an output dispatch processing example of the power generation planning apparatus according to the third embodiment.

FIG. 11 is a flowchart showing an output dispatch processing example of the power generation planning apparatus 10C according to the third embodiment, and, due to the addition of the multiple-case assumption output calculation unit 123, S15c1 and S15c2 have been added in substitute for S15 in comparison to the output dispatch processing of the second embodiment shown in FIG. 7.

In S11 to S14, the output range calculation unit 121B selects information required for the output calculation of the power generator such as the demand and the specification information of the power generator from the power generation planning information unit 11C, and calculates the output range of the power generator capable of satisfying the operational constraint. Subsequently, in S15c1, the power generation output range output calculation unit 122 calculates the power generator output in a representative case capable of output within the output range calculated in S14. Moreover, in S15c2, the multiple-case assumption output calculation unit 123 calculates the power generator output in multiple cases with difference market prices and demands based on the power generator output in the representative case. The processing of S15c1 and S15c2 in the third embodiment is now explained.

In explaining the processing of S15c1 and S15c2, the relation of the optimal output and power generation unit price of the power generator is shown in the following formula. It has been verified that, by satisfying the following formula within the output range, the power generator output becomes optimal and most economic, and following Formula (4) means that the output of each power generator is decided according to the power generation unit price λ.

[Math 4]

$$P_{it} = \frac{\lambda - b_i}{2a_i} \quad (4)$$

λ: power generation unit price according to output of power generator $P_{it}$: power output of power generator i $a_i$, $b_i$, $c_i$: power generation cost coefficient (indicates power generation cost based on $a_i P_{it}^2 + b_i P_{it} + c_i$)

Figure 12:
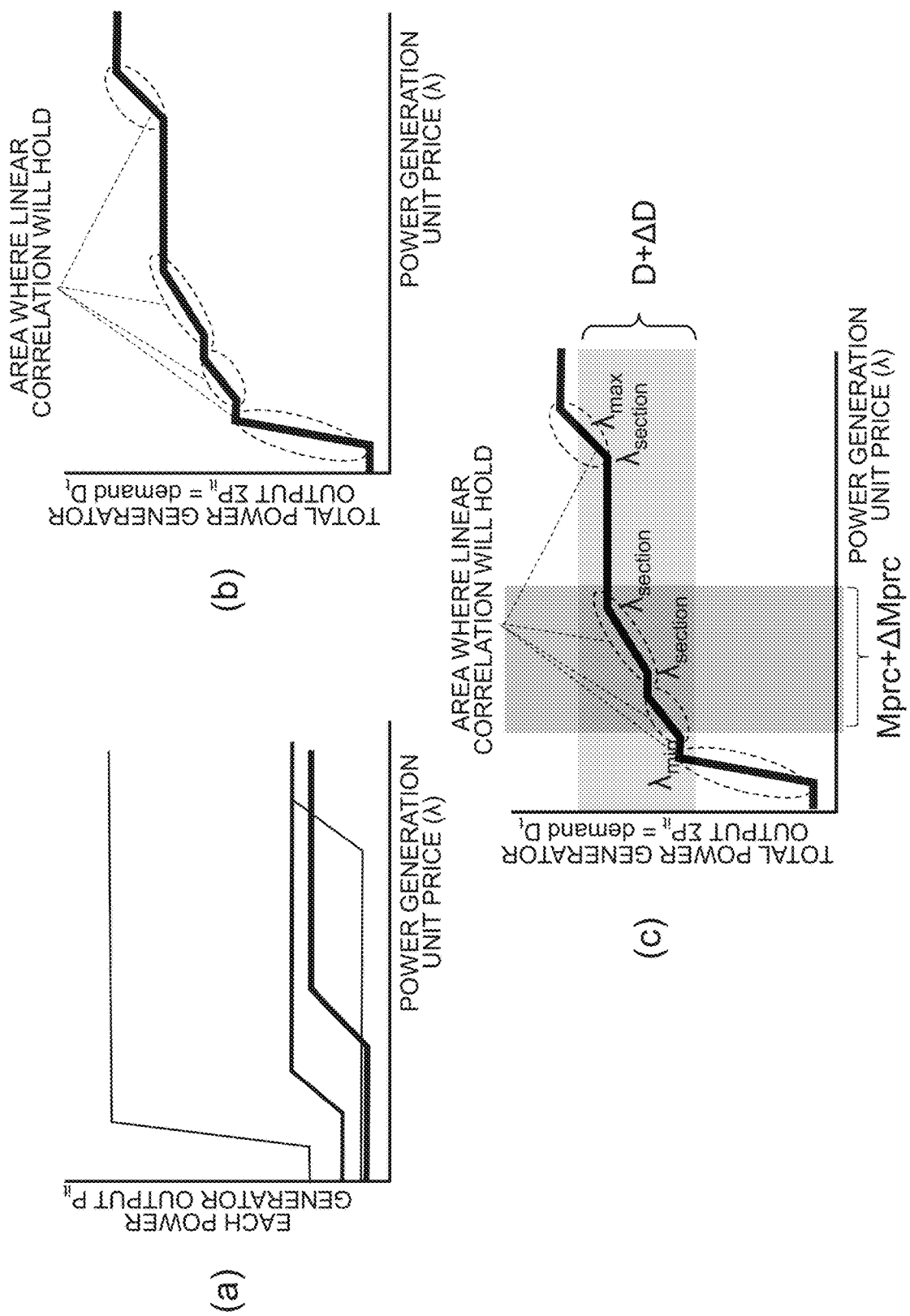
FIG. 12 is a diagram showing an example of the characteristics of the power output associated with the power generation unit price in relation to the processing performed by the power generation planning apparatus according to the third embodiment.

The relation of the power generation unit price λ and the output $P_{it}$ of each power generator based on foregoing Formula (4) is shown in FIG. 12(a), and the relation of the power generation unit price λ and the total power output $\Sigma P_{it}$ (=demand $D_t$) is shown in FIG. 12(b). Note that, in FIG. 12, while there is an area where the power output does not change even when the power generation unit price λ changes, this is because the power output has reached either the maximum value or the minimum value of the power output range.

Since each power generator has its own power generator output range, in the relation of the power generation unit price λ and the total power output $\Sigma P_{it}$ (=demand $D_t$) shown in FIG. 12(b), the existence of areas having a linear correlation with different inclinations can be confirmed. Consequently, it can be understood that, when the power generation unit price $\lambda_t$ that satisfies the demand $D_t$ is revealed, the fluctuation subsequent power generation unit price λ+Δλ can also be identified based on linear approximation pursuant to the demand fluctuation $\Delta D_t$ so as long as it is in the same area.

In explaining the processing of S15c1 and S15c2, an example of the relation of the market price $M_{prc}$ and the power generation unit price λ will also be explained in advance. In cases where a bid won in the power market will always result in a contract, profits can be increased in the utilization of the power market by selling electric power when the power generation unit price λ is lower than the market price $M_{prc}$ and buying electric power when the power generation unit price λ is higher than the market price $M_{prc}$. Consequently, as an example, profits can be gained by deciding the traded power Mt to be traded in the market according to the magnitude of relation between the power generation unit price λ and the market price $M_{prc}$ as shown in following Formula (5). In following Formula (5), Mk is the coefficient.

[Math 5]

$$M_t = \frac{\lambda - M_{prc}}{M_k} \quad (5)$$

Since foregoing Formula (5) is similar to foregoing Formula (4), Mt can be indicated with the same relation as FIG. 12 by deeming Mt to be the same as the power generator output $P_{it}$.

When the fluctuation of the power generation unit price λ associated with the fluctuation of the demand $D_t$ and the market price $M_{prc}$ described above belongs to the same area where the linear approximation holds as shown in FIG. 12(c), the linear relation of following Formula (6) will exist between the demand fluctuation ΔD and the market price fluctuation $\Delta M_{prc}$, and the fluctuation Δλ of the power generation unit price. Note that, since the traded power $M_t$ will change according to the market price $M_{prc}$, the traded power $M_t$ is treated as one type of demand fluctuation in following Formula (6), and has been indicated as a right member as with the demand. Moreover, α and β of following Formula (6) are coefficient values derived from the power generator constant of the power generator that has not yet reached the upper and lower limit of the output range and the coefficient $M_k$ of foregoing Formula (5).

[Math 6]

$$\Delta\lambda = \alpha\Delta D + \beta\Delta M_{prc} \quad (6)$$

Based on the approach related to the respective fluctuations of the demand fluctuation ΔD, the market price fluctuation $\Delta M_{prc}$, and the power generation unit price fluctuation Δλ described above, the processing of S15c1 and S15c2 will be as follows.

In S15c1, the power generation output range output calculation unit 122 calculates each representative case included in the linear section that will be affected by the input demand fluctuation ΔD and the market price fluctuation $\Delta M_{prc}$ as shown in FIG. 12(c), in the same manner as the second embodiment, based on the input of the demand fluctuation information (probability distribution) 11g and the power market price fluctuation information (probability distribution) 11h from the power generation planning information unit 11C. Here, since foregoing Formula (4) and Formula (5) are similar formulas, the traded power is used as the output by treating it in the same manner also when based on the market price fluctuation $\Delta M_{prc}$.

An example of selecting the representative case in the fluctuation range of D+ΔD or $M_{prc} + \Delta M_{prc}$ shown in FIG. 12(c) is now explained.

Routine (I): The power generation unit price $\lambda_{max}$ at the time of the maximum demand D+ΔD and the power generation unit price $\lambda_{min}$ at the time of the minimum demand D are calculated from the range of D+ΔD. Routine (II): since the changing point $\lambda_{section}$ of the linear section between $\lambda_{min}$ and $\lambda_{max}$ is a point where the output of the power generator becomes the maximum value or the minimum value of the output range, some $\lambda_{section}$ between $\lambda_{min}$ and $\lambda_{max}$ are selected based on the maximum value or the minimum value of the output range of each generator, and the demand $D_t$ and the power generation unit price $\lambda_t$ for each $\lambda_{section}$ are used as the representative case. Note that, since the fluctuation width of the power generation unit price λ based on the market trading may be ignored since the maximum trading volume is small in comparison to the fluctuation width Δλ of the power generation unit price relative to the change in the demand D, the market price $M_{prc}$ may be used.

In S15c2, the multiple-case assumption output calculation unit 123 creates one or more cases anticipating the demand fluctuation ΔD and the market price fluctuation ΔMprc, using a method such as Monte Carlo simulation of creating the occurrence probability and case from probability distribution, based on the demand fluctuation information (probability distribution) 11g and the power market price fluctuation information (probability distribution) 11h.

Subsequently, the multiple-case assumption output calculation unit 123 compares the case created by anticipating the demand fluctuation ΔD and the market price fluctuation ΔMprc with the demand for each $\lambda_{section}$ indicating the representative case selected in S15c1, and selects $\lambda_{section}$ as a neighborhood and the demand at such time. The multiple-case assumption output calculation unit 123 deems cases in the neighborhood of the respective representative cases among the multiple cases as similar cases, and sets the difference between the demands of similar cases and the representative case in the neighborhood thereof as $\Delta D$, and the difference between the market prices as $\Delta M_{prc}$. $\lambda_{section}+\Delta\lambda$ obtained by adding $\lambda_{section}$ indicating the representative case to $\Delta\lambda$ calculated from $\Delta D$, $\Delta M_{prc}$ and foregoing Formula (6) is used as the power generation unit price $\lambda$ in each of the similar cases. The power output in the similar cases is calculated by assigning the power generation unit price $\lambda$ in the similar cases to foregoing Formula (4) and Formula (5). The subsequent processing is the same as the other embodiments.

Note that the power generator output in each single time section may also be calculated by executing only the power output dispatch decision processing of S11 to S15c2 of FIG. 11.

Effect of Third Embodiment

According to the third embodiment, a relation of the total power output and the power generation unit price of the power generators is used for calculating the power generator output in a plurality of similar cases with different demands and prices, the representative values of demands and power generation unit prices that are representative for each linear area in which the linear approximation will hold are selected, and, when calculating similar cases, each power generator output is calculated based on the power generation unit price of the representative case and through linear approximation from demands and prices. In obtaining the power output in a plurality of similar cases, since the output computation is performed by optimizing only the representative case rather than calculating the output by optimizing each case and the output in the remaining cases is calculated based on linear approximation, the number of times that optimization is performed can be reduced drastically, and the computation time can be shortened considerably.

For example, in S17 of FIG. 11, when calculating the target power output $P_{it\_ideal}$ in the violating time section based on a condition excluding the power output ramp rate constraint, the same processing as S11 to S15c2 of FIG. 11 is performed. Here, the computation time can be further reduced by calculating the power generator output in a plurality of similar cases as in the third embodiment.

Other Embodiments

While the foregoing embodiments explained a case of applying the present invention to a power generation planning apparatus, the present invention is not limited thereto, and may also be broadly applied to various systems, devices, methods, and programs.

Moreover, in the foregoing explanation, information such as programs, tables, files and the like that realize the respective functions of the power generation planning apparatus may also be stored in a memory, or a storage device such as a hard disk or an SSD (Solid State Drive), or a storage medium such as an IC card, an SD card, a DVD or the like.

The present invention is not limited to the embodiments described above, and includes various modified examples. For example, the foregoing embodiments were explained in detail for explaining the present invention in an easy-to-understand manner, and the present invention is not necessarily limited to a type which comprises all of the configurations explained in the embodiments. Moreover, a part of the configuration of a certain embodiment may be replaced with the configuration of another embodiment, and the configuration of another embodiment may be added to the configuration of one embodiment. Furthermore, a part of the configuration of each embodiment may undergo addition, deletion, replacement, integration or distribution of another configuration. Moreover, the configuration and processing described in the embodiments described above may undergo distribution, integration or replacement as needed in light of processing efficiency or mounting efficiency.

REFERENCE SIGNS LIST 10, 10B, 10C: power generation planning apparatus, 11, 11C: power generation planning information unit, 12, 12B, 12C: single time section output dispatch unit, 13: constraint determination unit, 14: specified previous time section output correction unit, 15: single time section output saving unit, 21: display unit, 21a: display screen, 121, 121B: output range calculation unit, 122: power generation output range output calculation unit, 123: multiple-case assumption output calculation unit.

The invention claimed is:

1. A power generation planning apparatus comprising:
a communication device in communication over a network with a plurality of power generators of a power system;
a memory storing at least one program; and
a processor in communication with the memory and the communication device, the processor, when executing the at least one program, configured by the at least one program to perform operations including:
    determining an output range of at least one power generator of the plurality of power generators that satisfies a plurality of operational constraints;
    determining a power generator output of the at least one power generator in a single time section based on the output range determined for the at least one power generator;
    when an operational constraint violation occurs in the power generator output in the single time section, determining a target output for the at least one power generator in the single time section; and
    to eliminate the operational constraint violation, correcting the output ranges and the power generator outputs in the single time section and previous time sections so that the power generator output of the at least one power generator in the single time section becomes the target output.

2. The power generation planning apparatus according to claim 1, the operations further comprising:
correcting the output ranges and the power generator outputs in the previous time sections based on a power output ramp rate constraint of the at least one power generator.

3. The power generation planning apparatus according to claim 1, the operations further comprising:
selecting a power generator of the at least one power generator in which the output ranges and the power generator outputs in the previous time sections are to be corrected based on a difference value between the power generator output in the single time section in which an operational constraint violation occurred and the target output in the single time section, and a classification of the operational constraint violation.

4. The power generation planning apparatus according to claim 1, the operations further comprising:
  determining, in advance, an output range according to patterns of start/stop status of the at least one power generator and the operational constraint; and
  upon determining the output range of the at least one power generator, outputting the output range that was calculated in advance when the calculated output range corresponds to a pattern of the patterns of start/stop status.

5. The power generation planning apparatus according to claim 1, the operations further comprising:
  determining an output reserve of each power generator of the at least one power generator in each single time section based on an output range and a power generator output determined for the at least one power generator; and
  displaying the output reserve on a screen display or saving data of the output reserve.

6. The power generation planning apparatus according to claim 1, the operations further comprising:
  when calculating an output range which satisfies a plurality of operational constraints, integrating output ranges which satisfy each operational constraint in order according to a predetermined priority; and
  based at least on determining that there is no solution as an output range which satisfies the plurality of operational constraints in the process of integrating output ranges, determining an output range by excluding the operational constraint corresponding to no solution.

7. The power generation planning apparatus according to claim 6, the operations further comprising:
  determining the priority according to a constraint deviation amount for each of the operational constraints, or a number of constraint deviations for each classification of the operational constraint in previous time sections than the single time section in which the power generator output was determined.

8. A power generation planning apparatus comprising:
  a communication device in communication over a network with a plurality of power generators of a power system;
  a memory storing at least one program; and
  a processor in communication with the memory and the communication device, the processor, when executing the at least one program, configured by the at least one program to perform operations including:
    determining an output range of at least one power generator of the plurality of power generators that satisfies a plurality of operational constraints;
    determining a power generator output of the at least one power generator in a single time section based on the output range determined for the at least one power generator;
    classifying change characteristics of a frequency adjustment amount of an output of each at least one power generator into a low output band, a medium output band, and a high output band, wherein, in the low output band, the frequency adjustment amount increases when the output of the power generator is increased, in the medium output band, the frequency adjustment amount is unchanged even when the output of the power generator is changed, and, in the high output band, the frequency adjustment amount increases when the output of the power generator is decreased;
    securing the frequency adjustment amount preferentially from the high output band; and
    when a required frequency adjustment amount is not secured with the high output band, additionally securing the frequency adjustment amount from the low output band.

9. A power generation planning apparatus comprising:
  a communication device in communication over a network with a plurality of power generators of a power system;
  a memory storing at least one program; and
  a processor in communication with the memory and the communication device, the processor, when executing the at least one program, configured by the at least one program to perform operations including:
    determining an output range of at least one power generator of the plurality of power generators that satisfies a plurality of operational constraints;
    determining a power generator output of the at least one power generator in a single time section based on the output range determined for the at least one power generator;
    determining a power generator output in a single time section of a similar case anticipating a demand and a market price based on the power generator output determined for the at least one power generator in the single time section;
    selecting a representative case for each linear area in which a linear approximation will hold in a relation between a total of a demand or trading volume of a power market or power generator output and a power generation price;
    outputting the power generation price, demand and market price in the representative case; and
    determining a power generator output in a similar case in a neighborhood of the representative case within the linear area based on the linear approximation of a fluctuation amount of the demand and the market price of the similar case and fluctuation of the power generation price of the representative case.

* * * * *